US010967772B2

(12) United States Patent
Roman

(10) Patent No.: US 10,967,772 B2
(45) Date of Patent: Apr. 6, 2021

(54) VEHICLE SEAT CUSHION CARRIER ASSEMBLY FOR MODULAR VEHICLE SEAT OR THE LIKE

(71) Applicant: Volvo Car Corporation, Gothenburg (SE)

(72) Inventor: Robert Roman, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/254,672

(22) Filed: Jan. 23, 2019

(65) Prior Publication Data
US 2020/0231075 A1     Jul. 23, 2020

(51) Int. Cl.
*B60N 2/72* (2006.01)
*A47C 31/02* (2006.01)

(52) U.S. Cl.
CPC .............. *B60N 2/72* (2013.01); *A47C 31/023* (2013.01)

(58) Field of Classification Search
CPC ................................ B60N 2/72; A47C 31/023
USPC ............................................ 297/452.6, 218.5
See application file for complete search history.

(56) References Cited

U.S. PATENT DOCUMENTS

| 3,794,378 | A | * | 2/1974 | Haslam | ................. | B60N 2/5825 |
| | | | | | | 297/452.6 X |
| 5,641,552 | A | | 6/1997 | Tillner | | |
| 7,377,589 | B1 | | 5/2008 | Glater | | |
| 7,703,855 | B1 | * | 4/2010 | Kalinowski | ........... | B60N 2/809 |
| | | | | | | 297/452.6 X |
| 8,998,325 | B2 | | 4/2015 | Jonsson | | |
| 2003/0215601 | A1 | | 11/2003 | Pedde et al. | | |
| 2008/0150334 | A1 | | 6/2008 | Callaghan | | |
| 2009/0064471 | A1 | | 3/2009 | Santin et al. | | |
| 2009/0152909 | A1 | | 6/2009 | Andersson | | |

(Continued)

FOREIGN PATENT DOCUMENTS

DE        2014223955 A1     6/2015
DE      102015015700 A1     6/2016
(Continued)

OTHER PUBLICATIONS

May 13, 2020 European Search Report issued on International Application No. 20153374.

*Primary Examiner* — Anthony D Barfield
(74) *Attorney, Agent, or Firm* — Clements Bernard Walker; Christopher L. Bernard

(57) ABSTRACT

A vehicle seat cushion carrier assembly (bottom and back) via which a cushion carrier structure, cushion foam, and upholstery are more easily assembled and installed in a vehicle, optionally as a modular unit. The cushion carrier structure can be multi-piece and incorporate any desired trim units. Strap fasteners are used to secure the upholstery to the cushion carrier structure and cushion foam, creating the desired creating seams, creases, and indentations. Clip fasteners are used to secure the upholstery to the cushion carrier structure around the cushion foam, especially with respect to the seat back. This allows much of the upholstering to be done outside the vehicle, optionally in a modular manner. Finally, these modular features and functionalities allow the cushion carrier assemblies (bottom and back) to be quickly and easily secured to the underlying seat pan and/or seat frame using simple screws, hooks, and clip fasteners.

22 Claims, 17 Drawing Sheets

(56) References Cited

U.S. PATENT DOCUMENTS

| | | |
|---|---|---|
| 2015/0191223 A1 | 7/2015 | Ashworth |
| 2017/0297465 A1 | 10/2017 | Nagasawa |
| 2017/0355291 A1 | 12/2017 | Line et al. |
| 2018/0236915 A1 | 8/2018 | Agonia et al. |
| 2019/0031067 A1* | 1/2019 | Koehler .................. B60N 2/72 |

FOREIGN PATENT DOCUMENTS

| | | |
|---|---|---|
| EP | 2705981 A1 | 3/2014 |
| GB | 2328708 A | 3/1999 |
| JP | 20040249092 A | 9/2004 |
| WO | 2015067620 A1 | 5/2015 |
| WO | 2018019173 A1 | 2/2018 |

* cited by examiner

VEHICLE SEAT CUSHION CARRIER ASSEMBLY FOR MODULAR VEHICLE SEAT OR THE LIKE

TECHNICAL FIELD

The present invention relates generally to the automotive and vehicle seat fields. More specifically, the present invention relates to a vehicle seat cushion carrier assembly for a modular vehicle seat or the like. Such modular vehicle seats find applicability in both traditional and autonomous driving (AD) applications.

BACKGROUND ART

In general, vehicle seats are expensive and time consuming to design and develop. For a given vehicle application, a specific underlying seat structure is designed and sometimes crash tested before a "top hat," or finish package, and upholstery are selected and applied. This process requires relatively long lead times, especially when undertaken for every seating position in every vehicle platform. All seat components are ultimately dependent upon the underlying structure. This creates design limitations and requires expensive technical solutions, limiting "top hat" and upholstery flexibility and creativity.

For example, for a given vehicle platform, front buckets seats, a rear bench seat, optionally rear bucket seats, and optionally third row seats must typically be designed and developed, with different adjustment and comfort features built into each. For another vehicle platform, different front bucket seats, a different rear bench seat, optionally different rear bucket seats, and optionally different third row seats must typically be designed and developed, again with different adjustment and comfort features built into each. This is expensive and time consuming, especially as autonomous driving (AD) vehicles and the like with both front and rear facing seat configurations become a reality.

Further, when a seat (or a replacement seat or seat part) is installed in a vehicle, it is often partially or wholly assembled in or near the vehicle. For example, on a basic level, functional convenience and comfort units (such as heating pads, ventilation fans, massage units, etc.) and trim pieces are coupled to the seat frame, along with a cushion foam. Then, the cushion foam is upholstered using hog rings or the like. Hog rings are basically staples that secure the upholstery to/around the cushion foam, or wires disposed within or adjacent to the cushion foam, creating appropriate seams, creases, and indentations, such that a finished appearance is provided.

Such seat assembly processes are difficult and time consuming, especially in aftermarket applications, often providing an inconsistent appearance. This is true even when a cushion foam and upholstery are pre-assembled outside of a vehicle as a, essentially modular unit using hog rings or the like. This is especially problematic as the bottom and back portions of driver seats are often worn or damaged and in need of repair.

Thus, what is needed in the art is an improved modular concept, whereby a cushion carrier structure, cushion foam, and upholstery are more easily assembled and installed in a vehicle, in both original equipment manufacturing (OEM) and retrofit applications.

SUMMARY

The present invention provides such an improved vehicle seat cushion carrier assembly (bottom and back) via which a cushion carrier structure, cushion foam, and upholstery are more easily assembled and installed in a vehicle, optionally as a modular unit. The cushion carrier structure can be multi-piece and incorporate any desired trim units. The cushion carrier structure also has a design and configuration that allows the cushion carrier structure to be readily and securely coupled to the underlying seat pan and/or seat frame. Strap fasteners are used to secure the upholstery to the cushion carrier structure and cushion foam, creating the desired creating seams, creases, and indentations. This replaces the use of difficult and time consuming hog rings and the like. Clip fasteners are used to secure the upholstery to the cushion carrier structure around the cushion foam, replacing mechanisms that secure the upholstery to the seat frame, especially with respect to the seat back. This allows much of the upholstering to be done outside the vehicle, optionally in a modular manner. Finally, these modular features and functionalities allow the cushion carrier assemblies (bottom and back) to be quickly and easily secured to the underlying seat pan and/or seat frame using simple screws, hooks, and clip fasteners.

In one exemplary embodiment, the vehicle seat cushion carrier assembly provided herein includes: a seat cushion carrier structure adapted to be selectively coupled to seat frame of a vehicle seat; a seat cushion coupled to the seat cushion carrier structure; and an upholstery material disposed about the seat cushion and secured to the seat cushion carrier structure using one or more of a plurality of strap fasteners and a plurality of clip fasteners. Selected ones of the plurality of strap fasteners are coupled to an underside of the upholstery material, pass completely through the seat cushion, and are secured to one of an underside and a backside of the seat cushion carrier structure. Each of the plurality of strap fasteners includes a strap root adapted to be selectively coupled to the underside of the upholstery material and an adjoining elongate member adapted to be disposed completely through the seat cushion and engage a locking boss coupled to the backside of the seat cushion carrier structure. The strap root defines a retention channel adapted to selectively engage and retain one or more of a bead structure joined to the underside of the upholstery material and a seam manufactured into the underside of the upholstery material. The elongate member defines one or more holes adapted to selectively engage and be retained by the locking boss coupled to the backside of the seat cushion carrier structure. The elongate member is manufactured from a flexible material. Each of the plurality of clip fasteners includes a rail clip attached to an edge of the upholstery material and disposed about an edge of the seat cushion carrier structure.

In another exemplary embodiment, the vehicle seat upholstery strap fastener provided herein includes: a strap root adapted to be selectively coupled to an underside of an upholstery material; and an elongate member coupled to the strap root and adapted to be disposed completely through a seat cushion and engage a locking boss coupled to a backside of a seat cushion carrier structure adjacent to which the seat cushion is disposed. Optionally, the strap root and the elongate member are integrally formed. The strap root defines a retention channel adapted to selectively engage and retain one or more of a bead structure joined to the underside of the upholstery material and a seam manufactured into the underside of the upholstery material. The elongate member defines one or more holes adapted to selectively engage and be retained by the locking boss coupled to the backside of the seat cushion carrier structure. The elongate member is manufactured from a flexible material. The elongate member also defines a channel adapted to selectively engage and be guided by a guide boss coupled to the backside of the seat cushion carrier structure. The elongate member is adapted to selectively engage and be guided by a guide recess structure disposed one of in and on the backside of the seat cushion carrier structure. The elongate member includes a tapered tip portion opposite the strap root. The elongate member includes one or more friction gripping structures disposed on an exterior surface thereof.

In a further exemplary embodiment, the vehicle seat provided herein is assembled by a process including: coupling a modular seat cushion carrier assembly to a seat frame of the vehicle seat, wherein the modular seat cushion carrier assembly includes: a seat cushion carrier structure adapted to be selectively coupled to the seat frame of the vehicle seat; a seat cushion coupled to the seat cushion carrier structure; and an upholstery material disposed about the seat cushion and secured to the seat cushion carrier structure using one or more of a plurality of strap fasteners and a plurality of clip fasteners. Selected ones of the plurality of strap fasteners are coupled to an underside of the upholstery material, pass completely through the seat cushion, and are secured to one of an underside and a backside of the seat cushion carrier structure. Each of the plurality of strap fasteners includes a strap root adapted to be selectively coupled to the underside of the upholstery material and an adjoining elongate member adapted to be disposed completely through the seat cushion and engage a locking boss coupled to the backside of the seat cushion carrier structure. The strap root defines a retention channel adapted to selectively engage and retain one or more of a bead structure joined to the underside of the upholstery material and a seam manufactured into the underside of the upholstery material. The elongate member defines one or more holes adapted to selectively engage and be retained by the locking boss coupled to the backside of the seat cushion carrier structure. The elongate member is manufactured from a flexible material. Each of the plurality of clip fasteners includes a rail clip attached to an edge of the upholstery material and disposed about an edge of the seat cushion carrier structure.

BRIEF DESCRIPTION OF THE DRAWINGS

The present invention is illustrated and described herein with reference to the various drawings, in which like reference numbers are used to denote like assembly components/method steps, as appropriate, and in which:

FIG. 17 is a back perspective view illustrating the attachment of the seat back carrier assembly provided herein to the associated seat back frame using one or more screws or the like and bottom perspective view illustrating the attachment of the seat bottom carrier assembly provided herein to the associated seat bottom frame using one or more hook fasteners or the like.

DESCRIPTION OF EMBODIMENTS

Again, the present invention provides a vehicle seat cushion carrier assembly (bottom and back) via which a cushion carrier structure, cushion foam, and upholstery are more easily assembled and installed in a vehicle, optionally as a modular unit. The cushion carrier structure can be multi-piece and incorporate any desired trim units. The cushion carrier structure also has a design and configuration that allows the cushion carrier structure to be readily and securely coupled to the underlying seat pan and/or seat frame. Strap fasteners are used to secure the upholstery to the cushion carrier structure and cushion foam, creating the desired creating seams, creases, and indentations. This replaces the use of difficult and time consuming hog rings and the like. Clip fasteners are used to secure the upholstery to the cushion carrier structure around the cushion foam, replacing mechanisms that secure the upholstery to the seat frame, especially with respect to the seat back. This allows much of the upholstering to be done outside the vehicle, optionally in a modular manner. Finally, these modular features and functionalities allow the cushion carrier assemblies (bottom and back) to be quickly and easily secured to the underlying seat pan and/or seat frame using simple screws, hooks, and clip fasteners.

Figure 1:
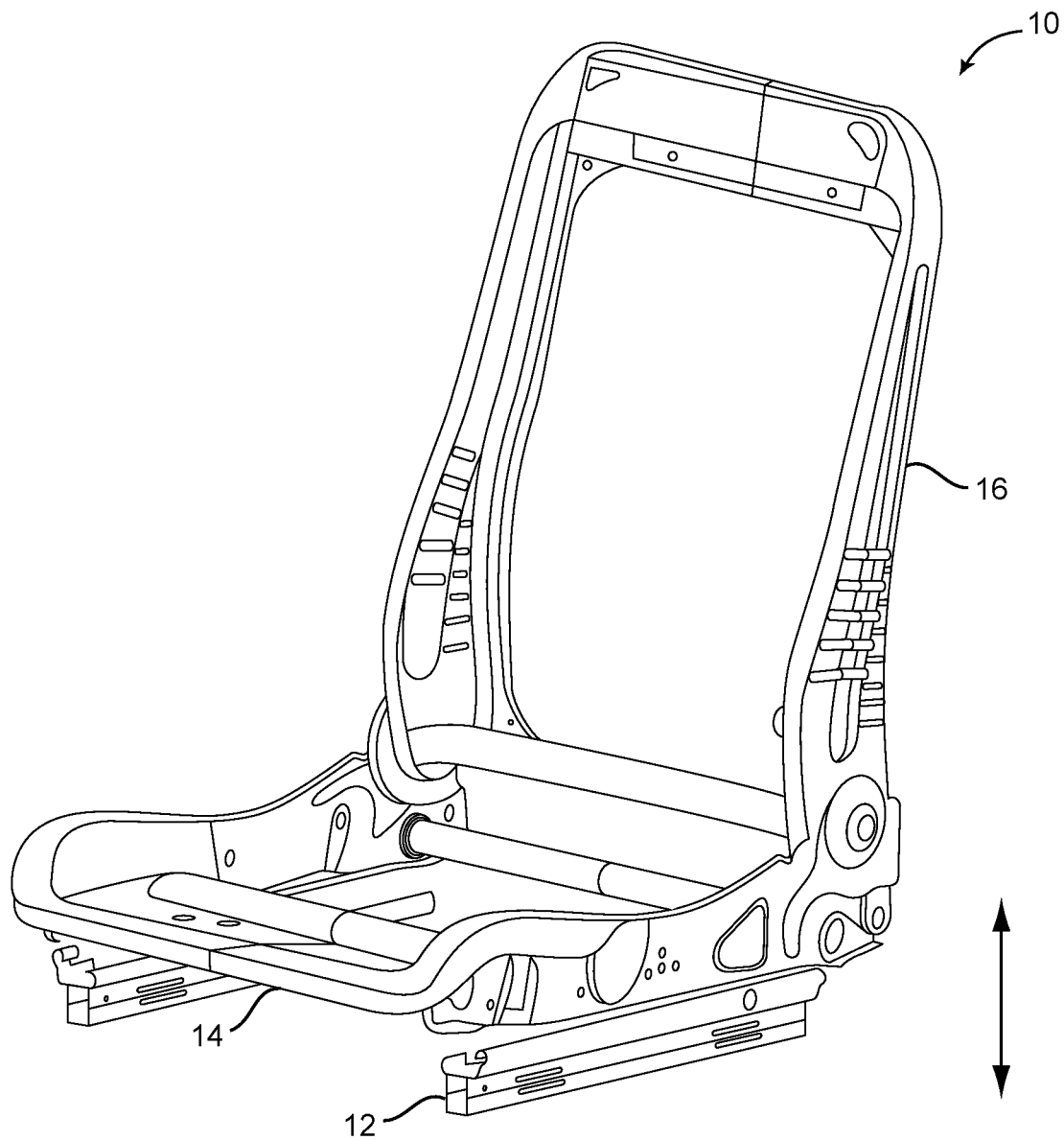
FIG. 1 is a schematic diagram illustrating one exemplary embodiment of a seat base module of a modular vehicle seat system that can utilize the cushion carrier assemblies provided herein.

Referring now specifically to FIG. 1, in one exemplary embodiment, the seat base module 12 of a modular vehicle seat system 10 in which the cushion carrier assemblies provided herein can be used includes a structural box or frame structure, made of metallic and/or plastic side members and cross members, that is adapted to be rigidly coupled to a structure (i.e., the floor) of a vehicle on a bottom side of the seat base module 12 and to a seat bottom structure module 14 on a top side of the seat base module 12. This seat base module 12 is not required in all modular vehicle seat system configurations—only when a degree of height is required between the associated seat bottom structure module 14 and the floor of the vehicle. For example, the seat base module 12 is typically used in front seat and second row seat applications, but not in third row seat applications, or when a seat 10 is disposed on a tunnel, wheel well, or other structure of the vehicle. In such cases, the seat bottom structure module 14 is disposed directly on the underlying vehicle structure. Optionally, the seat base module 12 includes one of a mechanical and an electromechanical elevation mechanism adapted to vary the height of the seat bottom structure module 14 with respect to one or more of the seat base module 12 and the underlying structure of the vehicle. Such elevation mechanisms are well known to those of ordinary skill in the art and typically include a rotational or stepper motor coupled to an actuator mechanism, with a Hall sensor or the like used to enable seat memory functionality, for example. In this application, the seat base module 12 forms a discrete, unitary module, including the elevation mechanism, that can be taken off the shelf and assembled into the vehicle using any conventional attachment means, such as bolts, mechanical fasteners, and the like. These modules 12 can come in large and small or wide and narrow configurations, for example, provided that a limited number of "one size fits all," "off-the-shelf" options are available. The modules 12 provide height accommodation and/or adjustment capability and/or functionality to the modular vehicle seat system 10. The seat base module 12 can also be equipped with means for accommodating z-thud deformation, as appropriate.

Figure 2:
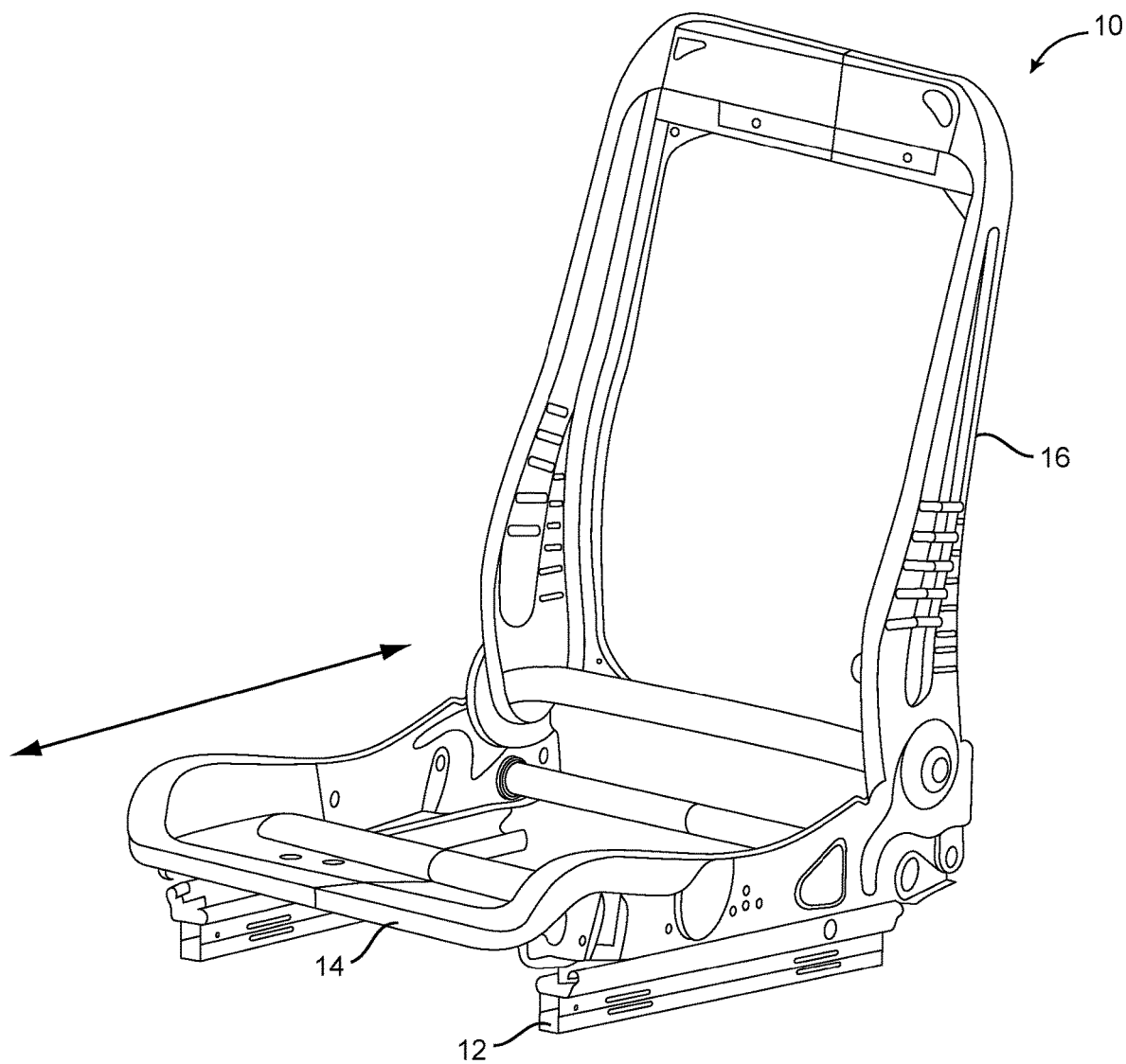
FIG. 2 is a schematic diagram illustrating one exemplary embodiment of a seat bottom structure module of a modular vehicle seat system that can utilize the cushion carrier assemblies provided herein.

Referring now specifically to FIG. 2, in one exemplary embodiment, the seat bottom structure module 14 of the modular vehicle seat system 10 is adapted to be rigidly or translatably coupled to one of the seat base module 12 and directly to the underlying structure of the vehicle on a bottom side of the seat bottom structure module 14. The seat bottom structure module 14 generally includes a metallic frame structure, including metallic and/or plastic side members and cross members. Again, the seat base module 12 is not required in all modular vehicle seat system configurations—only when a degree of height is required between the associated seat bottom structure module 14 and the floor of the vehicle. For example, the seat base module 12 is typically used in front seat and second row seat applications, but not in third row seat applications, or when a seat 10 is disposed on a tunnel, wheel well, or other structure of the vehicle. In such cases, the seat bottom structure module 14 is disposed directly on the underlying vehicle structure. Optionally, the seat bottom structure module 14 includes one of a mechanical and an electromechanical translation mechanism adapted to vary the forward/rearward position of the seat bottom structure module 14 with respect to one or more of the seat base module 12 and the underlying structure of the vehicle. Such translation mechanisms are well known to those of ordinary skill in the art and typically include a rotational or stepper motor coupled to an actuator mechanism, with a Hall sensor or the like used to enable seat memory functionality, for example. In this application, the seat bottom structure module 14 also forms a discrete, unitary module, including the translation mechanism, that can be taken off the shelf and assembled to the seat base module 12 using any conventional attachment means, such as bolts, mechanical fasteners, and the like. These modules 14 can also come in large and small or wide and narrow configurations, for example, provided that a limited number of "one size fits all," "off-the-shelf" options are available. The modules 14 provide width accommodation and/or translational adjustment capability and/or functionality to the modular vehicle seat system 10. The seat bottom structure module 14 is adapted to be securely coupled to a seat bottom cushion carrier module (not illustrated) on a top side of the seat bottom structure module 14, and rigidly or pivotably coupled to the seat back structure module 16 on one or more of a top side and a back side of the seat bottom structure module 14. Optionally, the seat bottom structure module 14 further includes a vibration damper mechanism adapted to dampen vibration of the seat bottom structure module 14 with respect to the one of the seat base module 12 and the structure of the vehicle.

Figure 3:
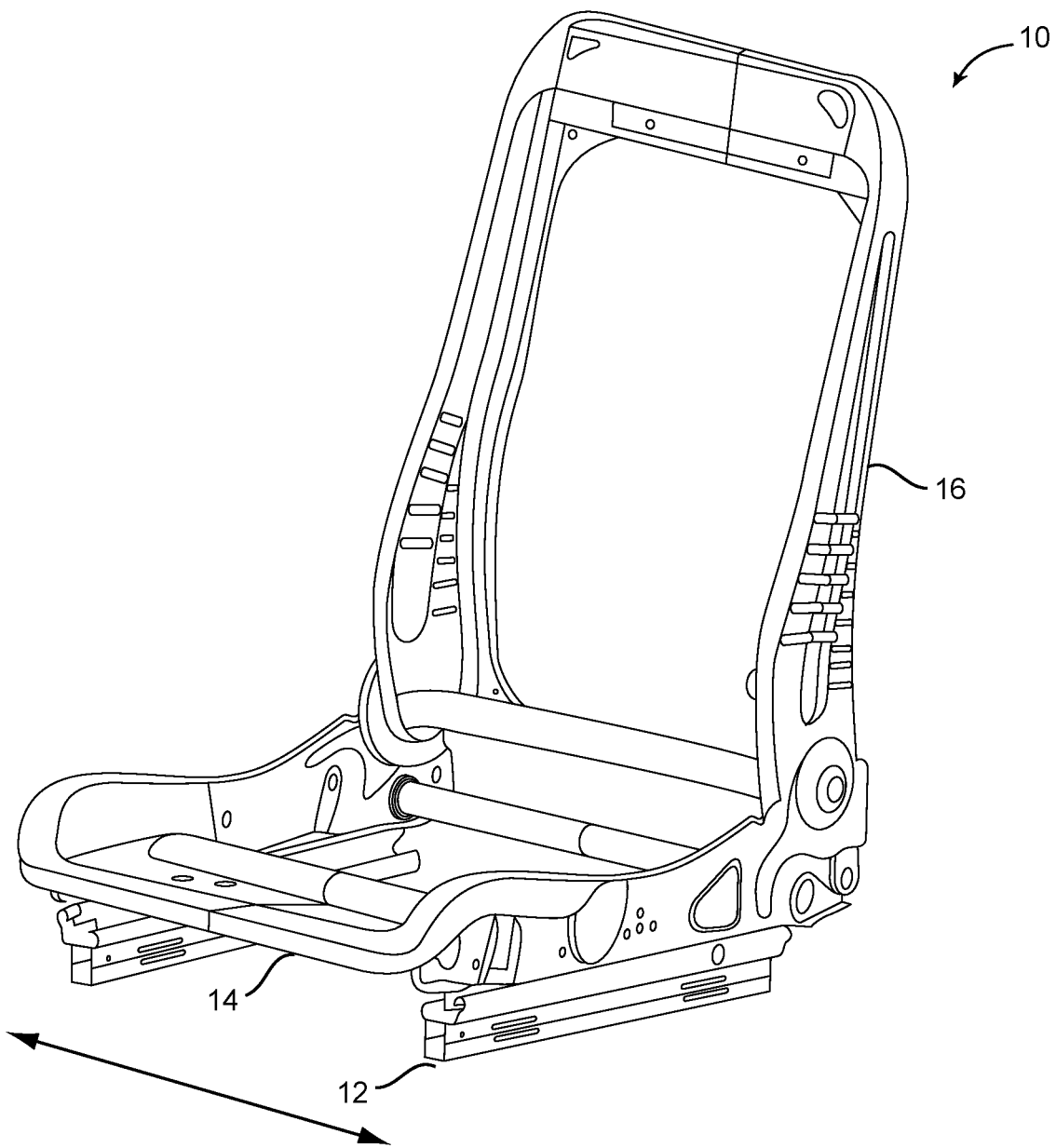
FIG. 3 is a schematic diagram illustrating one exemplary embodiment of a seat back structure module of a modular vehicle seat system that can utilize the cushion carrier assemblies provided herein.

Referring now specifically to FIG. 3, in one exemplary embodiment, the seat back structure module 16 of the modular vehicle seat system 10 is adapted to be rigidly or pivotably coupled to the seat bottom structure module 14 on a bottom side of the seat back structure module 16, securely coupled to a seat back cushion carrier module (not illustrated) on a front side of the seat back structure module 16, and translatably coupled to a head rest (not illustrated) on a top side of the seat back structure module 16. The seat back structure module 16 generally includes a metallic frame structure, including metallic and/or plastic side members and cross members. Optionally, the seat back structure module 16 includes one of a mechanical and an electromechanical reclining and/or folding mechanism adapted to vary the reclining and/or folding angle of the seat back structure module 16 with respect to the seat bottom structure module 14. Such reclining and/or folding mechanisms are well known to those of ordinary skill in the art and typically include a rotational or stepper motor coupled to an actuator mechanism, with a Hall sensor or the like used to enable seat memory functionality, for example. In this application, the seat back structure module 16 also forms a discrete, unitary module, including the reclining and/or folding mechanism, that can be taken off the shelf and assembled to the seat bottom structure module 14 using any conventional attachment means, such as bolts, mechanical fasteners, and the like. These modules 16 can also come in large and small or wide and narrow configurations, for example, provided that a limited number of "one size fits all," "off-the-shelf" options are available. The modules 16 provide width accommodation and/or reclining/folding adjustment capability and/or functionality to the modular vehicle seat system 10. The seat back structure module 16 is adapted to be securely coupled to a seat back cushion carrier module (not illustrated) on a front side of the seat back structure module 16, and rigidly or pivotably coupled to the seat bottom structure module 14 on one or more of a top side and a back side of the seat bottom structure module 14. The head rest coupled to the seat back structure module 16 can be fixed or adjustable, and can incorporate whiplash protection functionality, well known to those of ordinary skill in the art. An air bag module (not illustrated) can also be coupled to either or both sides of the seat back structure module 16. Generally, the seat back structure module 16 is configured to receive a seat back cover (not illustrated).

In addition to the modular vehicle seat system 10 described by way of context herein, it will be readily apparent to those of ordinary skill in the art that the cushion carrier assemblies provided herein can be used in numerous other systems and applications as well, both modular and traditional. In this sense, the cushion carrier assemblies act as an enabling technology for the modular vehicle seat system 10 that also have much wider applicability.

Figure 4:
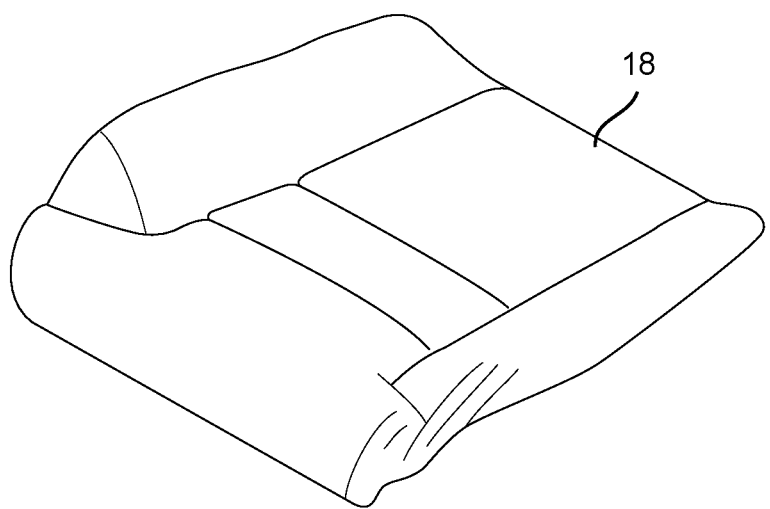
FIG. 4 is a schematic diagram illustrating one exemplary embodiment of a seat bottom cushion carrier module of a modular vehicle seat system that can utilize the cushion carrier assemblies provided herein.

Referring now specifically to FIG. 4, in one exemplary embodiment, the seat bottom cushion carrier module 18 is adapted to be securely coupled to the top side of the seat bottom structure module 14 (FIGS. 1-3) on a bottom side of the seat bottom cushion carrier module 18. The seat bottom cushion carrier module 18 includes a seat bottom cushion support member, including a metallic or plastic support frame, and a foam seat bottom cushion. Optionally, the seat bottom cushion carrier module 18 is pre-upholstered off-the-shelf. The seat bottom cushion carrier module 18 is coupled to the seat bottom structure module 14 using conventional straps or the like, well known to those of ordinary skill in the art. Advantageously, the seat bottom cushion carrier module 18 includes one or more interior portions and/or surfaces for receiving functional modules (not illustrated) therein or thereon. The functional modules can include, but are not limited to, a tilt module operable for tilting the cushion carrier 18, an extension module operable for extending a front portion of the cushion carrier 18, a heat module, a ventilation module, an occupant detection module operable for detecting an occupant seated on the cushion carrier 18, a massage module, an integrated child safety seat module, and an armrest module. In this manner, the cushion carrier 18 can be customized with functional modules that are rapidly coupled thereto and accommodate any desired application.

Figure 5:
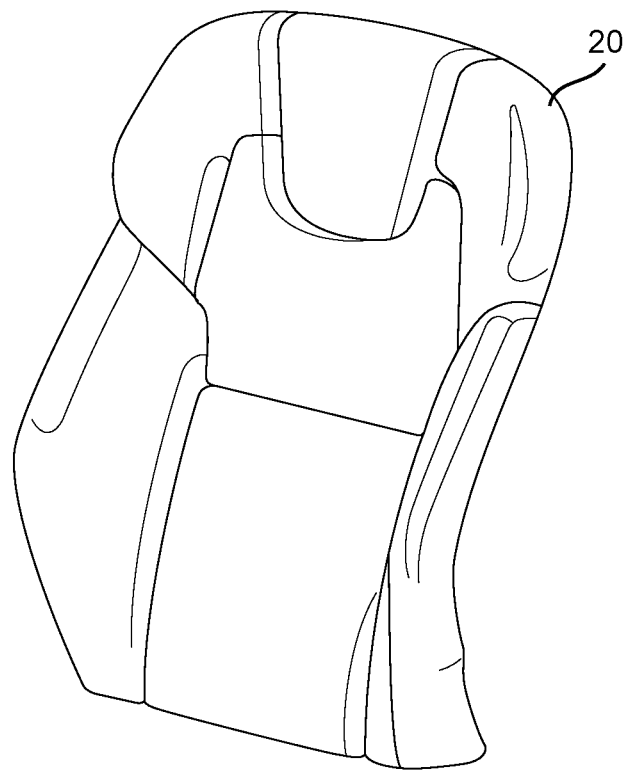
FIG. 5 is a schematic diagram illustrating one exemplary embodiment of a seat back cushion carrier module of a modular vehicle seat system that can utilize the cushion carrier assemblies provided herein.

Referring now specifically to FIG. 5, in one exemplary embodiment, the seat back cushion carrier module 20 is also adapted to be securely coupled to the front side of the seat back structure module 16 (FIGS. 1-3) on a back side of the seat back cushion carrier module 20. The seat back cushion carrier module 20 includes a seat back cushion support member, including a metallic or plastic support frame, and a foam seat back cushion. Optionally, the seat back cushion carrier module 20 is pre-upholstered off-the-shelf. The seat back cushion carrier module 20 is coupled to the seat back structure module 16 using conventional straps or the like, well known to those of ordinary skill in the art. Advantageously, the seat back cushion carrier module 20 includes one or more interior portions and/or surfaces for receiving functional modules (not illustrated) therein or thereon. The functional modules can include, but are not limited to, an extension module operable for extending side portions of the cushion carrier 20, a heat module, a ventilation module, an occupant detection module operable for detecting an occupant seated on the cushion carrier 20, a lumbar support module, a massage module, an integrated child safety seat module, and an armrest module. In this manner, this cushion carrier 20 can also be customized with functional modules that are rapidly coupled thereto and accommodate any desired application.

Figure 6:
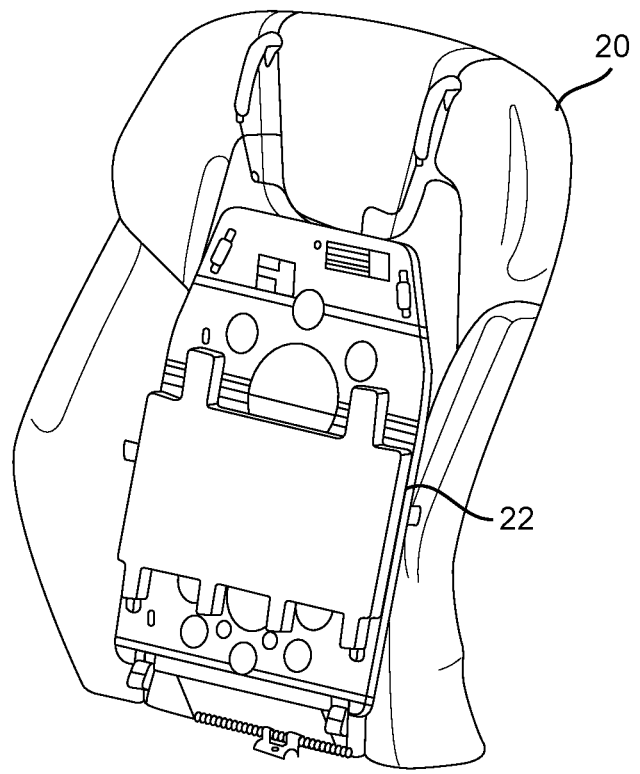
FIG. 6 is a schematic diagram illustrating one exemplary embodiment of a functional insert module of a modular vehicle seat system that can utilize the cushion carrier assemblies provided herein.

FIG. 6 illustrates an exemplary functional module 22 engaged with the seat back cushion carrier module 20. It should be noted that, ultimately, upholstery covers the seat back cushion carrier module 20 and engaged functional module 22, and any conventional electrical connections can be made from the functional module 22 to other modules and/or vehicle structures and/or systems.

Figure 7:
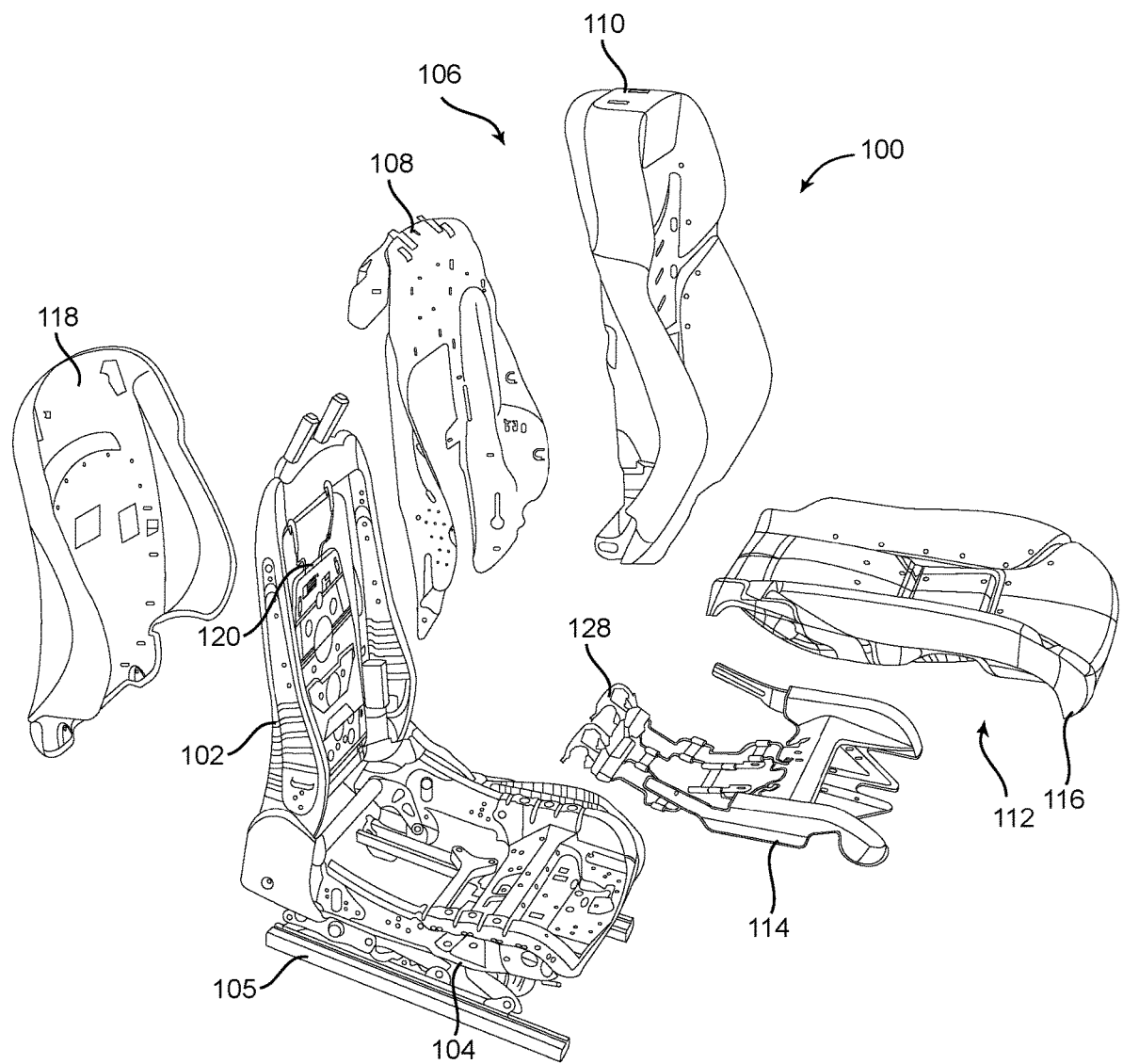
FIG. 7 is an exploded perspective view of one exemplary embodiment of a vehicle seat utilizing the cushion carrier assemblies provided herein.

Referring now specifically to FIG. 7, in one exemplary embodiment, the vehicle seat 100 provided herein, whether traditional or modular in nature, generally includes a seat back frame 102 that is pivotably coupled to a seat bottom frame 104, both of which are well known to those of ordinary skill in the art. The seat bottom frame 104 is configured to be secured to a base structure 105 and/or a floor structure of the vehicle. A seat back cushion carrier assembly 106 is coupled to the seat back frame 102. This seat back cushion carrier assembly 106 includes a seat back carrier structure 108 to which a seat back cushion 110 is coupled. The seat back cushion 110 is covered with an upholstery material, such as fabric, leather, or a synthetic material, which is secured to the seat back carrier structure 108. Preferably, the seat back frame 102 is formed from a metal or metal alloy and the seat back carrier structure 108 is formed from a plastic material. Collectively, the seat back carrier structure 108, the seat back cushion 110, and the upholstery can be installed as a unitary modular assembly. A seat bottom cushion carrier assembly 112 is coupled to the seat bottom frame 104. This seat bottom cushion carrier assembly 112 includes a seat bottom carrier structure 114 to which a seat bottom cushion 116 is coupled. The seat bottom cushion 116 is also covered with an upholstery material, such as fabric, leather, or a synthetic material, which is secured to the seat bottom carrier structure 114. Preferably, the seat bottom frame 104 is formed from a metal or metal alloy and the seat bottom carrier structure 114 is formed from a plastic material. Collectively, the seat bottom carrier structure 114, the seat bottom cushion 116, and the upholstery can also be installed as a unitary modular assembly. The back of the seat 100 includes a seat back cover 118 that is coupled to the seat back frame 102 opposite the seat back cushion carrier assembly 106.

A functional unit 120, such as a heating unit, a cooling unit, a massage unit, and/or the like, can be coupled to the seat back frame 102, the seat bottom frame 104, the seat back cushion carrier structure 108, the seat bottom cushion carrier structure 114, the seat back cushion 110, and/or the seat bottom cushion 116, underneath the associated upholstery. For example, the functional unit 120 can be coupled to the seat back frame 102 or seat bottom frame 104 and affect a vehicle occupant through a port manufactured into the associated seat back carrier structure 108 or seat bottom carrier structure 114 and the associated seat back cushion 110 or seat bottom cushion 116. Alternatively, the functional unit 120 can be disposed within the seat back cushion 110 or seat bottom cushion 116.

Figure 8:
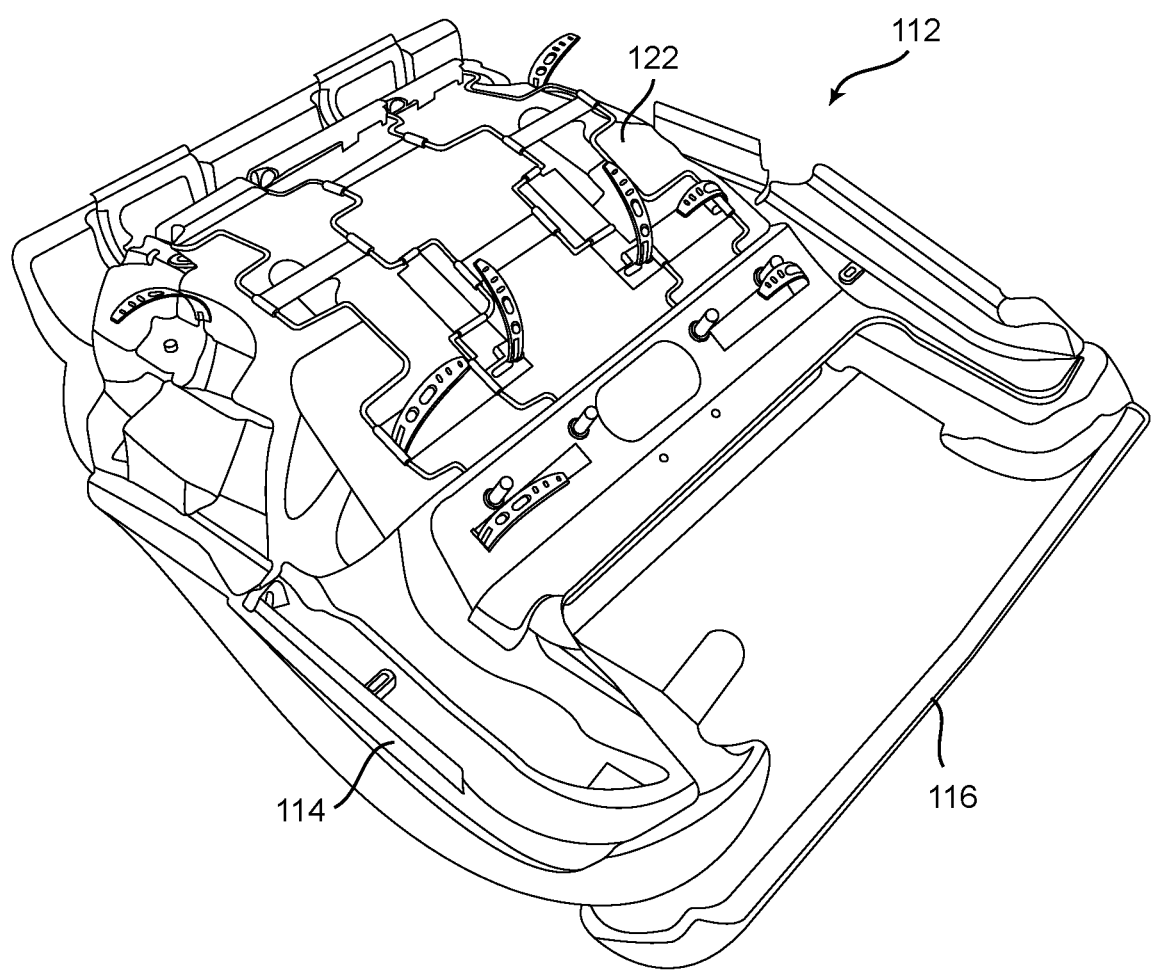
FIG. 8 is a bottom perspective view of one exemplary embodiment of the seat bottom cushion carrier assembly provided herein.

Referring now specifically to FIG. 8, in one exemplary embodiment, the seat bottom carrier structure 114 of the seat bottom carrier assembly 112 is disposed adjacent to, conformally nested into, adhered to, and/or mechanically fastened to the seat bottom cushion 116 such that the two components form a unitary component that is ultimately upholstered before it is attached to the associated seat bottom frame 104 (FIG. 7). A plurality of strap fasteners 122 are disposed through the seat bottom cushion 116 and seat bottom carrier structure 114, securing the upholstery to the seat bottom carrier structure 114 about and through the seat bottom cushion 116, as is described in greater detail herein below. In general, the seat bottom carrier structure 114 is shaped such that it conformally engages the underlying seat bottom frame 104, and the seat bottom cushion 116 is shaped such that it has a desired finished appearance that provides a safe and comfortable seating surface for the vehicle occupant. It should be noted that the seat bottom carrier structure 114 and/or seat bottom cushion 116 can define any suitable recesses or channels that provide appropriate access for a coupled or adjacent functional unit 120 (FIG. 7), as described herein above.

Figure 9:
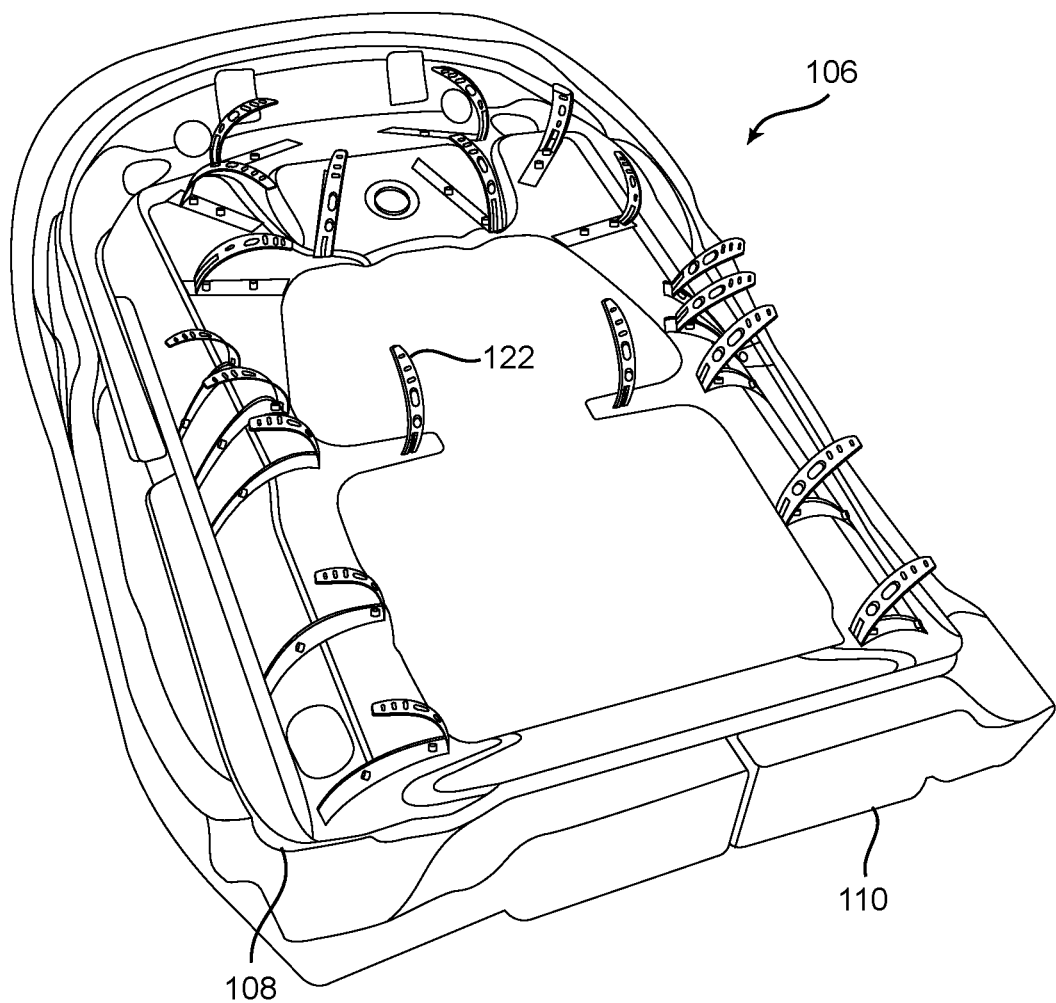
FIG. 9 is a back perspective view of one exemplary embodiment of the seat back cushion carrier assembly provided herein.

Referring now specifically to FIG. 9, in one exemplary embodiment, the seat back carrier structure 108 of the seat back carrier assembly 106 is disposed adjacent to, conformally nested into, adhered to, and/or mechanically fastened to the seat back cushion 110 such that the two components form a unitary component that is ultimately upholstered before it is attached to the associated seat back frame 102 (FIG. 7). A plurality of strap fasteners 122 are disposed through the seat back cushion 110 and seat back carrier structure 108, securing the upholstery to the seat back carrier structure 108 about and through the seat back cushion 110, as is described in greater detail herein below. In general, the seat back carrier structure 108 is shaped such that it conformally engages the underlying seat back frame 102, and the seat back cushion 110 is shaped such that it has a desired finished appearance that provides a safe and comfortable seating surface for the vehicle occupant. It should be noted that the seat back carrier structure 108 and/or seat back cushion 110 can define any suitable recesses or channels that provide appropriate access for a coupled or adjacent functional unit 120 (FIG. 7), as described herein above.

Figure 10:
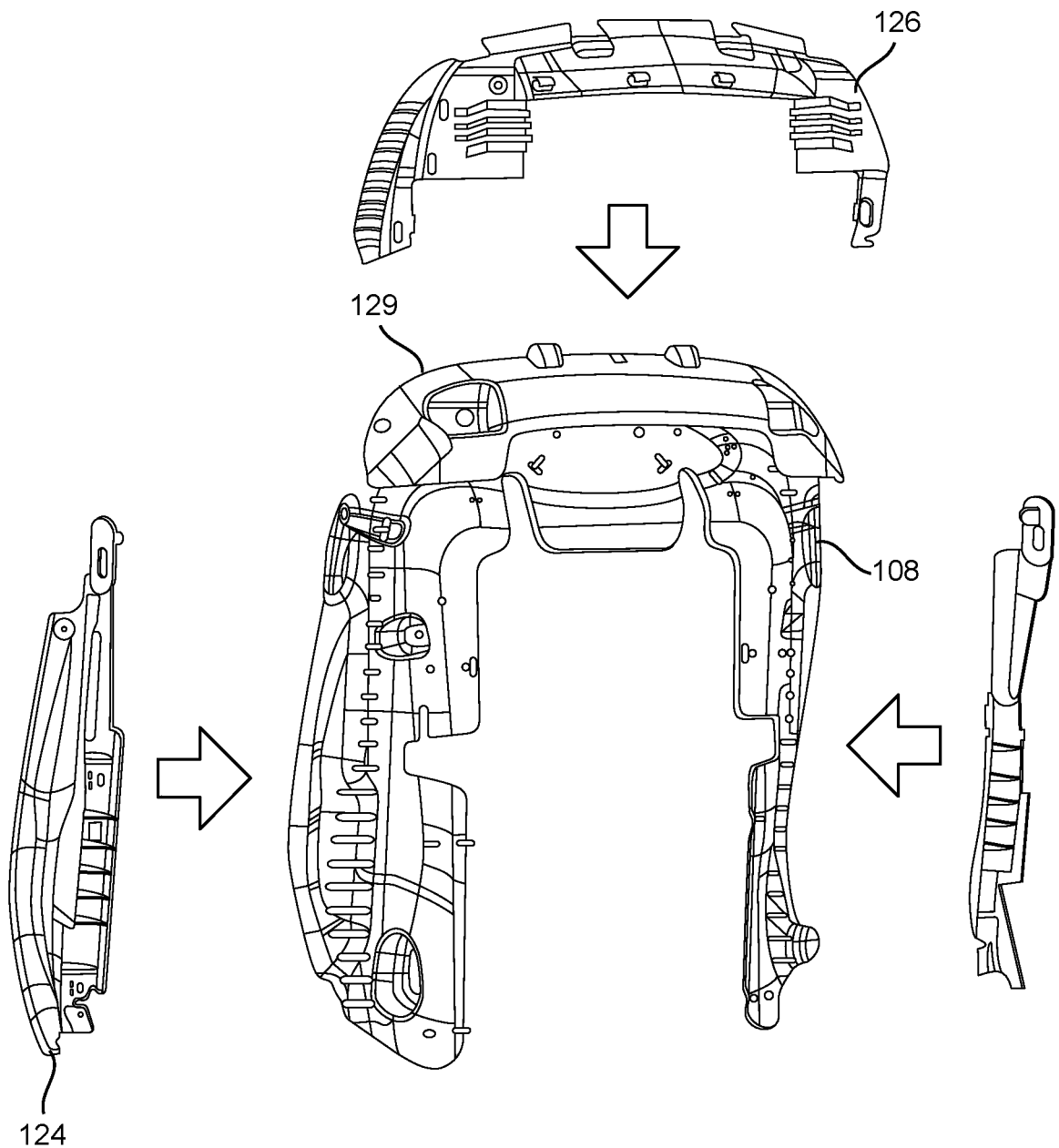
FIG. 10 is a back exploded perspective view of one exemplary embodiment of the seat back cushion carrier structure provided herein, highlighting the attachment of top and side trim units to the seat back cushion carrier structure.

Referring now specifically to FIG. 10, the seat back carrier structure 108 can include both attached side trim bolsters 124 and an attached top trim bolster 126, all of which affect the ultimate appearance and performance of the vehicle seat 100. These bolsters 124,126 can be made of a plastic material, for example, and can be attached to the seat back carrier structure 108 using screws or any other suitable type of fastener. The bolsters 124,126 can also be integrally formed with the seat back carrier structure 108. The seat bottom carrier structure 114 (FIG. 8) can also include similar bolsters, if desired. Preferably, the top trim bolster 126 includes one or more screw holes 129 through which the top trim bolster 126 is securely affixed to the seat back frame 102 (FIG. 7) when the seat back carrier structure 108 is engaged with the seat back frame 102. The attachment of the various bolsters 124,126 to the seat back carrier structure 108 and/or seat bottom carrier structure 114 allows the upholstery to be secured around the seat back cushion carrier assembly 102 (FIG. 7) and/or the seat bottom cushion carrier assembly 104 (FIG. 7) outside the vehicle before each is coupled to the respective seat frame 102,104 (FIG. 7). This enhances the modularity advantage provided herein.

Figure 11:
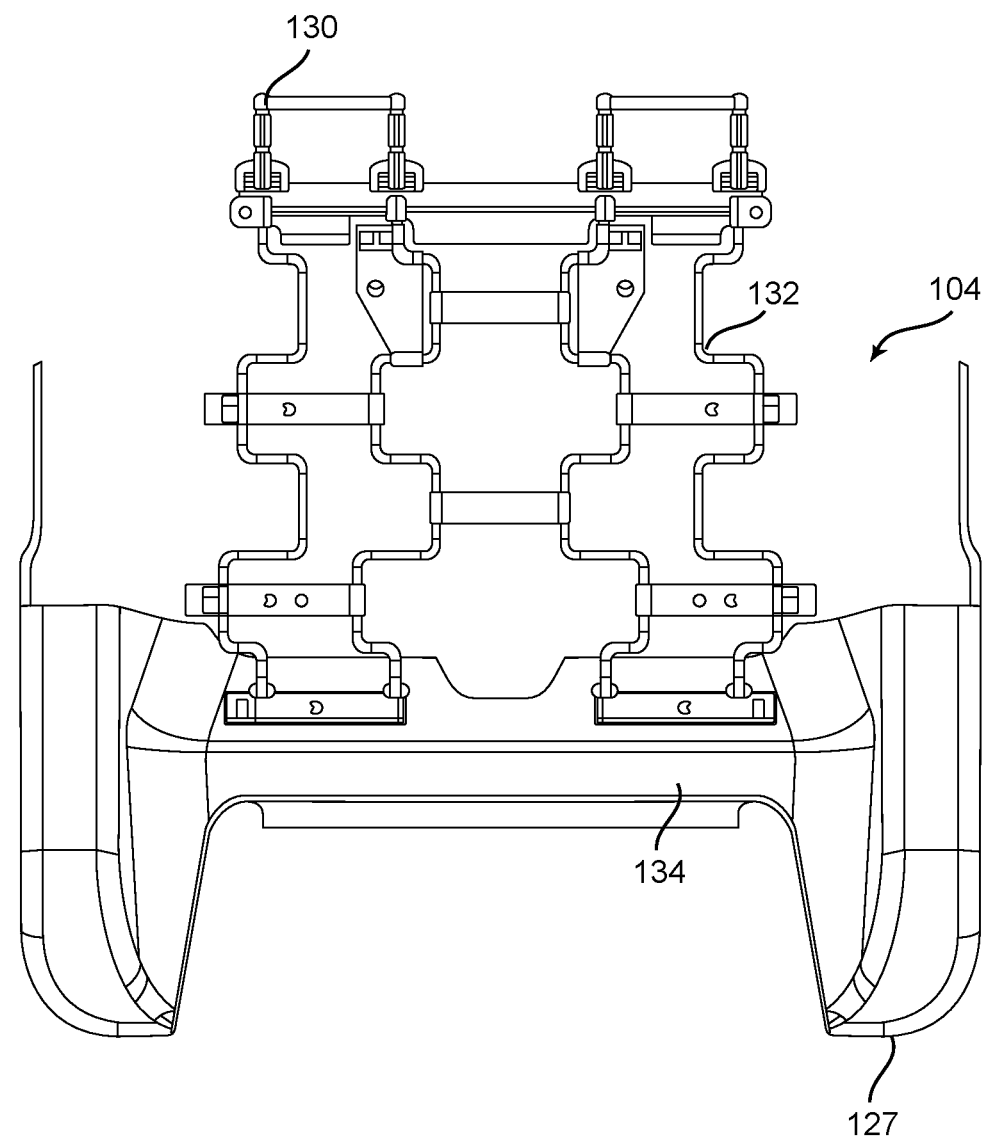
FIG. 11 is a top and side planar view of one exemplary embodiment of a vehicle seat pan to which the seat bottom cushion carrier structure provided herein can be coupled.
Figure 11:
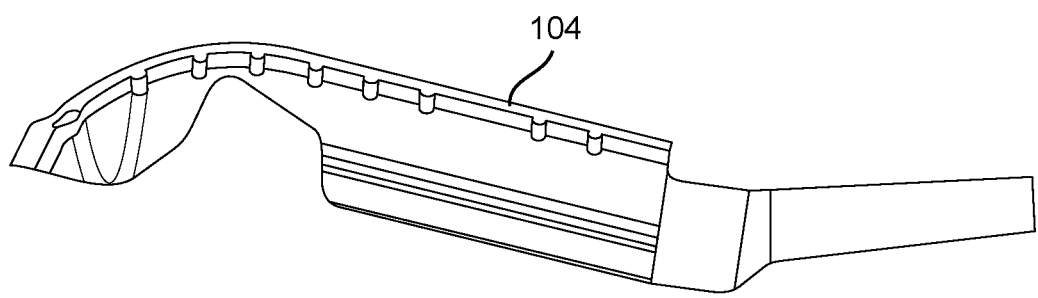

FIG. 11 illustrates a conventional seat bottom frame/seat pan 104 to which the seat bottom cushion carrier assembly 112 (FIG. 7) is ultimately coupled. Preferably, the seat bottom carrier structure 114 (FIG. 7) has a shape that substantially conforms to a front portion 127 of the seat bottom frame/seat pan 104, such that the seat bottom carrier structure 114 is guided by and nests on the seat bottom frame/seat pan 104. The seat bottom carrier structure also includes a plurality of hook members 128 (FIG. 7) at a rear portion thereof that engage a plurality of receiver members 130 located at a rear portion of the seat bottom frame/seat pan 104. Preferably, the majority of the seat bottom carrier structure 114 is separated from the underlying seat bottom frame/seat pan 104 by at least a few millimeters, such that the majority of the seat bottom carrier structure 114 does not actually contact the underlying seat bottom frame/seat pan 104. This prevents the seat bottom carrier structure 114 from interfering with the movement and operation of the seat bottom frame/seat pan 104. The majority of the seat bottom carrier structure 114 can contact the intermediate flex mat 132, which acts as a guide for and otherwise supports the seat bottom carrier structure 114. Accordingly, plugs 134 from the flex mat 132 can act as guides for the seat bottom carrier structure 114 and engage the seat bottom frame/seat pan 104.

Figure 12:
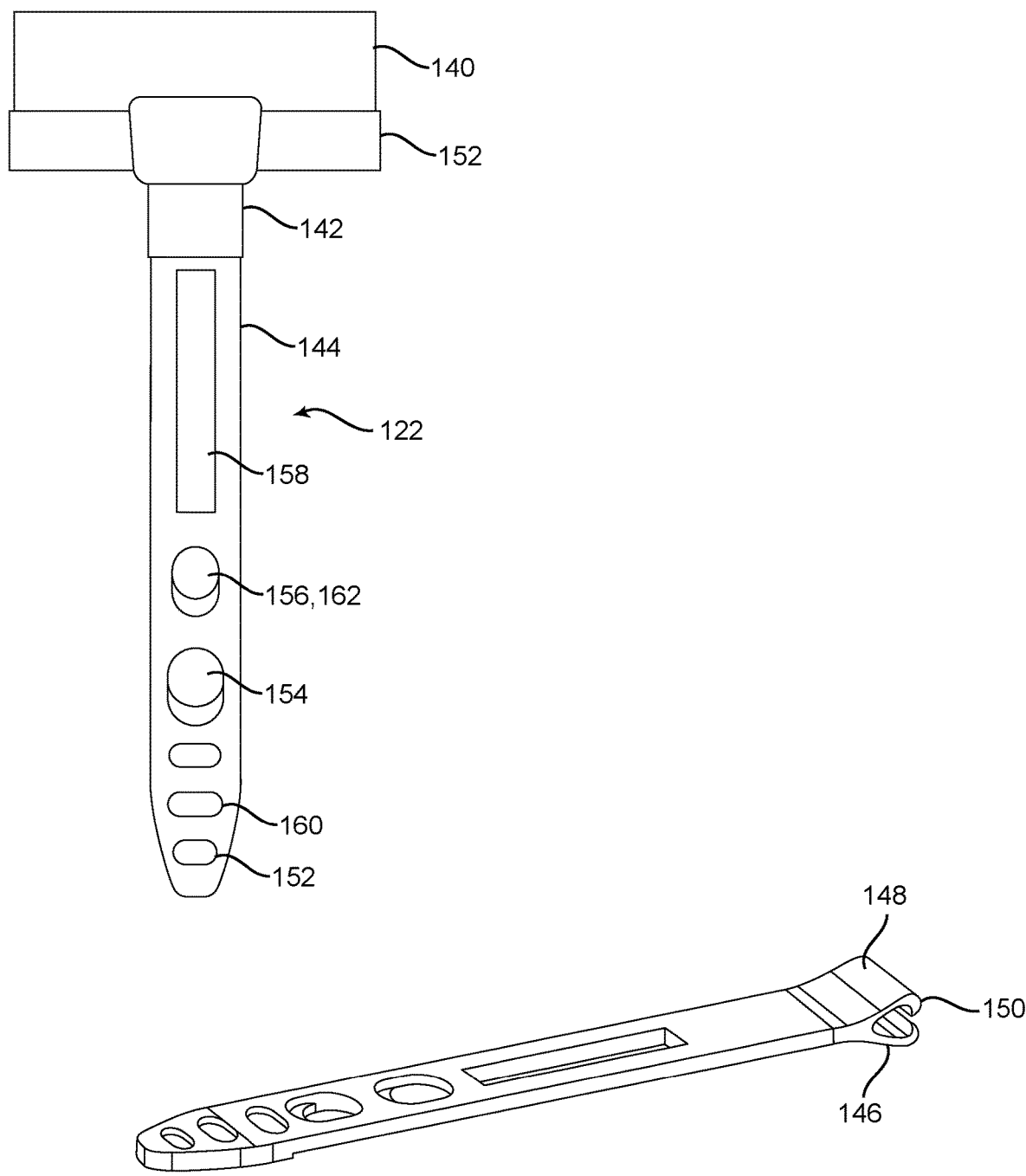
FIG. 12 is a front planar and perspective view of one exemplary embodiment of the strap fastener provided herein, where the strap fastener is used to couple upholstery to the cushion carrier structures around the associated cushion foam.

Referring now specifically to FIG. 12, in one exemplary embodiment, the strap fasteners 122 provided herein are used to fasten and tighten the upholstery 140 to the associated seat bottom cushion 116 (FIG. 7) or seat back cushion 110 (FIG. 7) along the desired seams, indentations, and/or design details, providing concave and convex seat surfaces. These strap fasteners 122 thus replace conventional hog rings and the like that are typically coupled to wires or other structures embedded in the underlying cushions 116,110. Advantageously, the strap fasteners 122 pass completely through channels provided in the foam of the cushions 116, 100 and are secured to the underlying seat bottom carrier structure 114 (FIG. 7) or seat back carrier structure 108 (FIG. 7). The strap fasteners 122 are flexible and have a degree of elasticity, typically being formed from a plastic material, and thus are easy and effective to work with. They can come in a variety of basic sizes, such that they can accommodate different thicknesses of foam.

Each strap fastener 122 includes a strap root 142 coupled to an elongate member 144. In this exemplary embodiment, the strap root 142 includes a U or V-shaped channel 146 that is open at one end and consists of a pair of opposed arms 148. Each arm 148 includes an inwardly protruding barb 150 or the like. The channel 146, via the opposed arms 148 and barbs 150, is configured to selectively engage and retain a widened plastic bead or seam 152 coupled to or disposed on a bottom/back side of the upholstery 140 being retained. The barbs 150 prevent the widened plastic bead or seam 152 from being pulled out of or otherwise removed from the channel 146 and strap root 142, thereby securing the strap fastener 122 to the upholstery 140. It will be readily apparent to those of ordinary skill in the art that other means for coupling the strap root 142 to the underside of the upholstery 140 could be used equally, depending upon the desired application, materials involved, etc. For example, the strap root 142 could incorporate conventional hog rings, be sewed or laminated directly to the upholstery 140, etc.

The elongate member 144 of the strap fastener 122 is removably or fixedly coupled to, or integrally formed with, the strap root 142, such that the elongate member 144 can be used to pull on the strap root 142 and plastic bead or seam 152 and upholstery 140 held thereby. The elongate member 144 has a generally rectangular shape with a tapered tip 152 such that it can be pushed or pulled through holes in foam and the associated seat bottom carrier structure 114 or seat back carrier structure 108. The elongate member 144 includes a number of holes and channels manufactured therein, including a first locking hole 154 configured to selectively engage a locking boss manufactured on the bottom/back side of the underlying seat carrier structure 114,108 and provide a first longer effective upholstery retention length, a second locking hole 156 also configured to selectively engage the locking boss manufactured on the bottom/back side of the underlying seat carrier structure 114,108 and provide a second shorter effective upholstery retention length, and a tightening channel 158 configured to selectively translatably engage a guide boss manufactured on the bottom/back side of the underlying seat carrier structure 114,108 adjacent to the locking boss and guide the position and orientation of the elongate member 144 as it is pulled tight and locked. Importantly, the interplay of a slight eccentricity of the locking holes 154,156, the elasticity of the elongate member 144, and a slight lip manufactured onto the top of the locking boss means that the strap fastener 122 can be pulled tight, thereby pulling the upholstery 140 tight, and secured to the underlying seat carrier structure 114,108, maintaining the indentations desired in the foam and upholstery 140. The length of the elongate member 144 makes it easy to handle, adjust, and pull during this process, even after passing through the foam and carrier structure 114,108. The elongate member 144 preferably includes friction gripping surface 160 to assisting in handling, adjusting, and pulling, and a plug 162 can remain disposed in the second locking hole 156 when not used to retain the structural integrity and strength of the elongate member 144.

Figure 13:
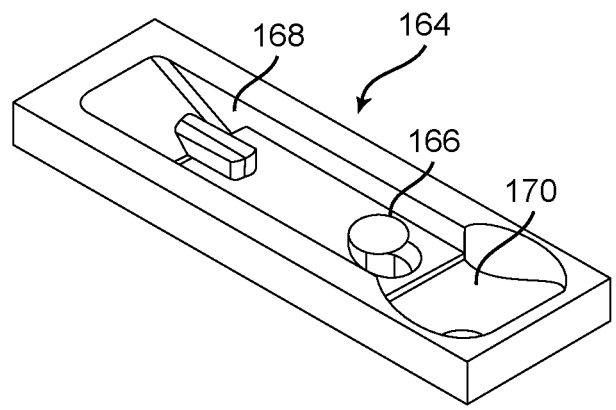
FIG. 13 is a perspective and cross-sectional side view of one exemplary embodiment of the strap locking mechanism provided herein, where the strap locking mechanism is used to secure the strap fastener to the associated cushion carrier structure.
Figure 13:
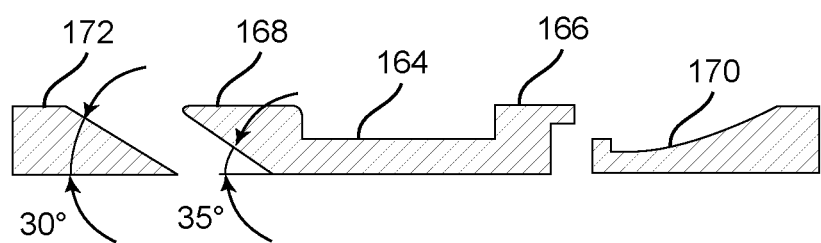

Referring now specifically to FIG. 13, in one exemplary embodiment, the locking tabs 164 manufactured into/on or disposed on the various carrier structures 114,108 for receiving and retaining each strap fastener 122 (FIG. 12) each include the locking boss 166 configured to be selectively engaged by the first locking hole 154 (FIG. 12) or second locking hole 156 (FIG. 12) of the associated elongate member 144 (FIG. 12) and the guide boss 168 configured to be selectively translatably engaged by the tightening channel 158 (FIG. 12) of the associated elongate member 144, both of which are disposed in a recess 170 that substantially conforms to the dimensions of the elongate member 144 and further serves to guide the elongate member 144 as it is being manipulated and secured. It should be note that the hole 172 in the carrier structure 114,108 through which the elongate member 144 passes is preferably angled away from the locking boss 166 and guide boss 168, thereby further serving to selectively retain and secure the elongate member 144.

Figure 14:
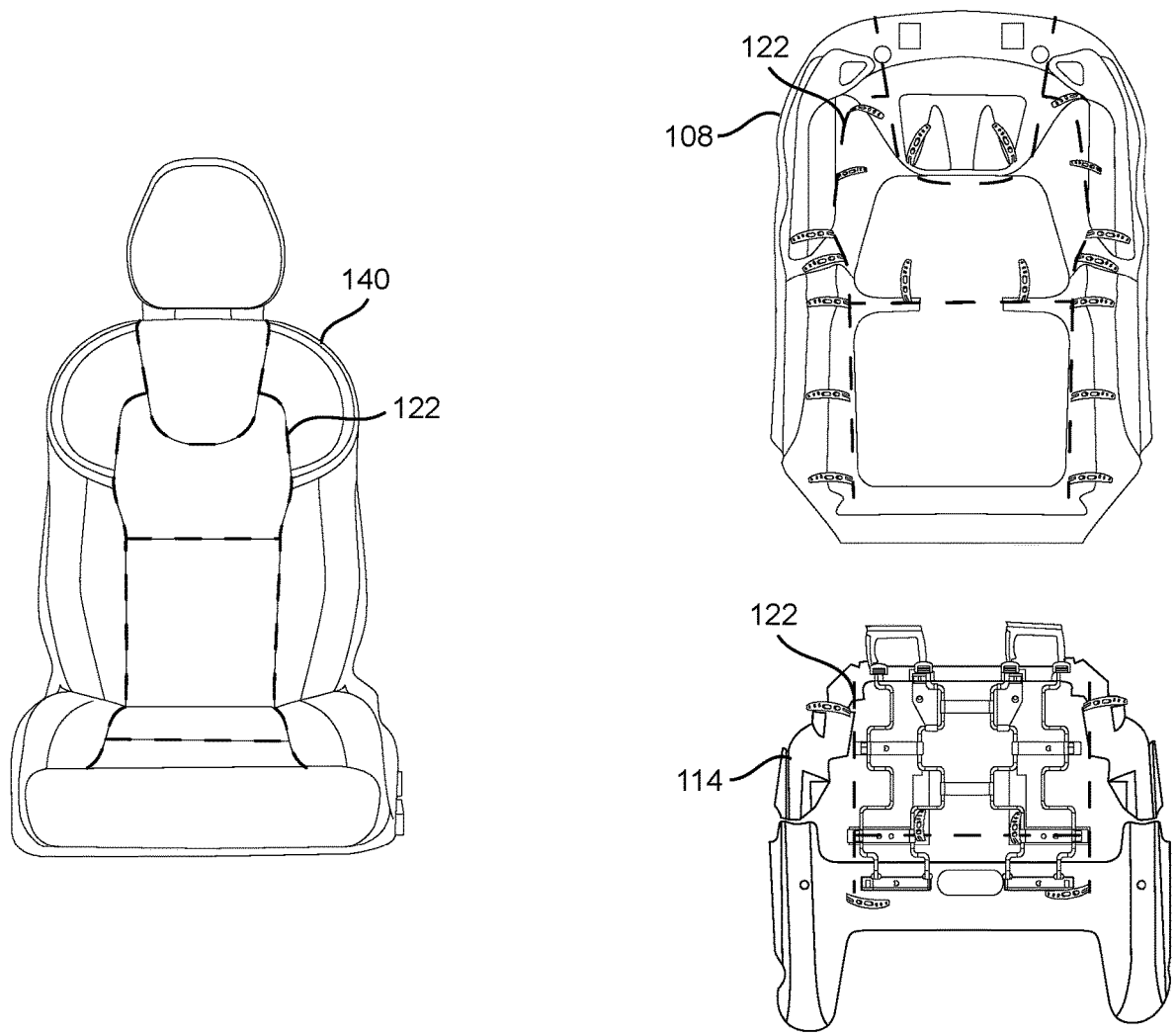
FIG. 14 is a front planar view of a vehicle seat, a back planar view of the associated seat back cushion carrier structure, and a bottom planar view of the associated seat bottom cushion carrier structure, all highlighting the positioning of the adjoining strap fasteners.

FIG. 14 highlights an exemplary arrangement of strap fasteners 122 with respect to the upholstery 140, seat back carrier structure 108, and seat bottom carrier structure 114 such that a given aesthetic design is created. Of course, other configurations are possible.

Figure 15:
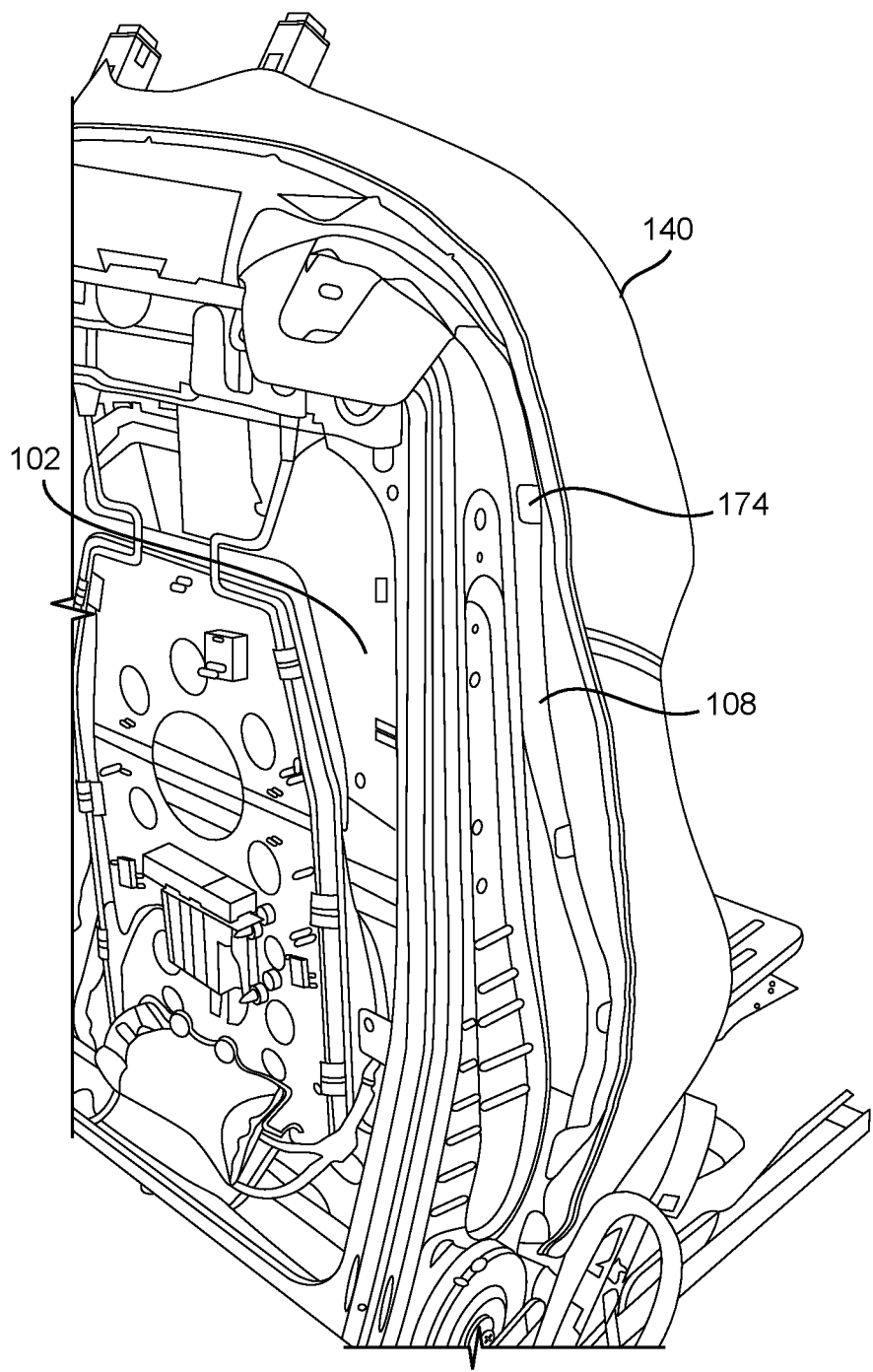
FIG. 15 is a partial back perspective view of a vehicle seat, highlighting the attachment of the upholstery to the associated seat back carrier structure using one exemplary embodiment of the clip fastener provided herein.

Although equally applicable to a seat bottom structure, FIG. 15 illustrates the use of clip fasteners 174 to secure upholstery 140 to the edges of a seat back carrier structure 108, which is subsequently joined to the associated seat back frame 102. It can be appreciated that, advantageously, this arrangement obviates the need to couple a side air bag module to the seat back carrier structure 108 or upholster over such side air bag module. Here, the side air bag module can be coupled directly to the seat back frame 102, freeing it from any upholstery interference and enhancing manufacturing simplicity. In additional to clip fasteners 174, any edges of the upholstery can also be conventionally secured to the seat back carrier structure 108, and seat back frame 102 in places, which is equally applicable to the seat bottom structure.

Figure 16:
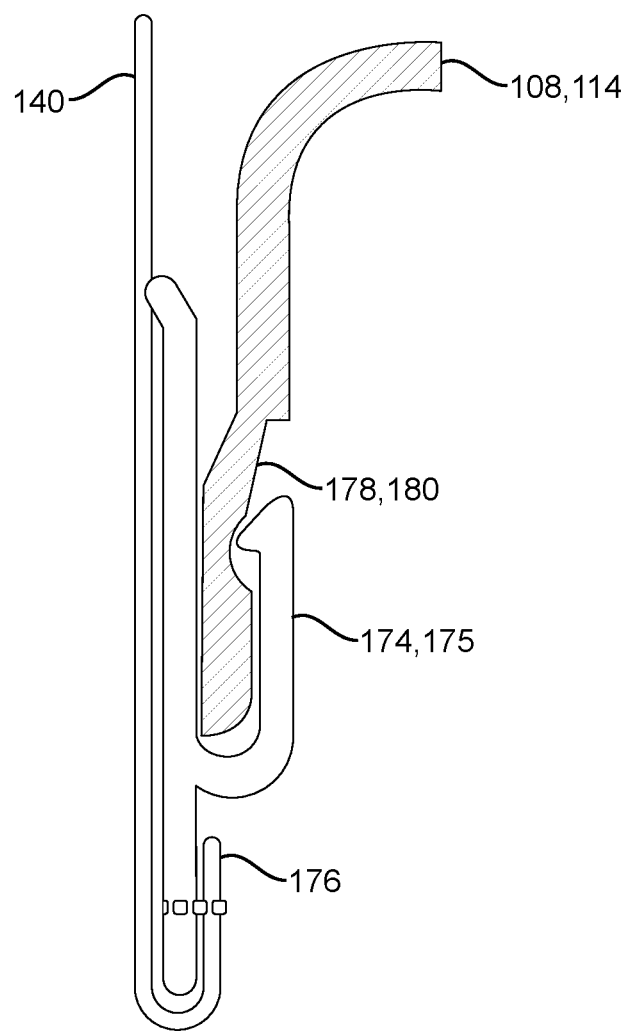
FIG. 16 is a cross-sectional side view of one exemplary embodiment of the clip fastener provided herein, where the clip fastener is also used to couple upholstery to the cushion carrier structures around the associated cushion foam.

Referring now specifically to FIG. 16, in one exemplary embodiment, the clip fastener 174 provided herein includes a U-shaped plastic or metal rail clip 175 around an elongate tail 176 of which the upholstery 140 to be secured is folded and stitched, fastened, adhered, or otherwise secured. The rail clip 175 is then pulled and disposed over an exposed edge of the associated seat carrier structure 108,114, thereby securing the upholstery around the intervening foam to the seat carrier structure 108,114. This replaces conventional fasteners and methodologies. As is illustrated, the rail clip 175 preferably incorporates an internal barb 178 or the like that helps secure the rail clip to a corresponding recess 180 manufactured into the rail of the seat carrier structure 108,114.

Figure 17:
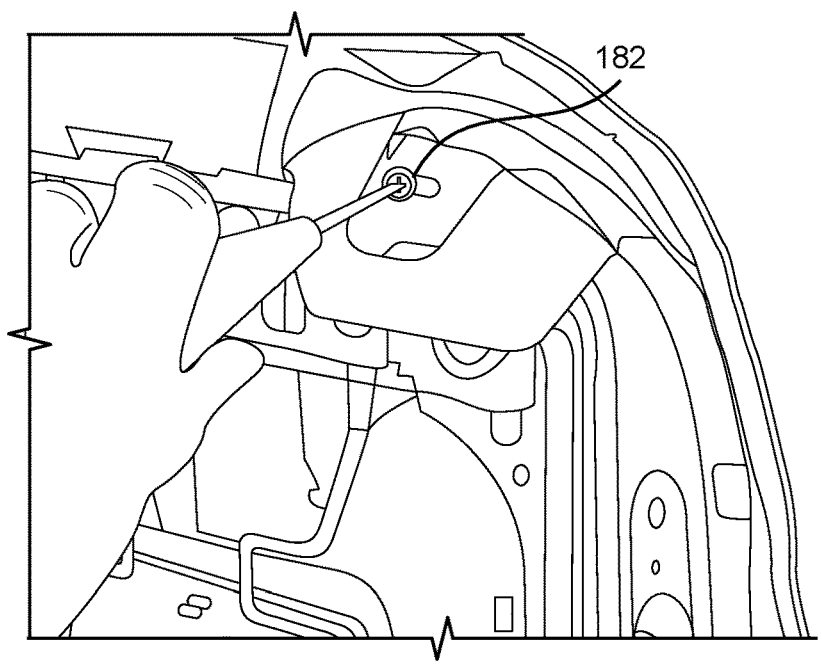
Figure 17:
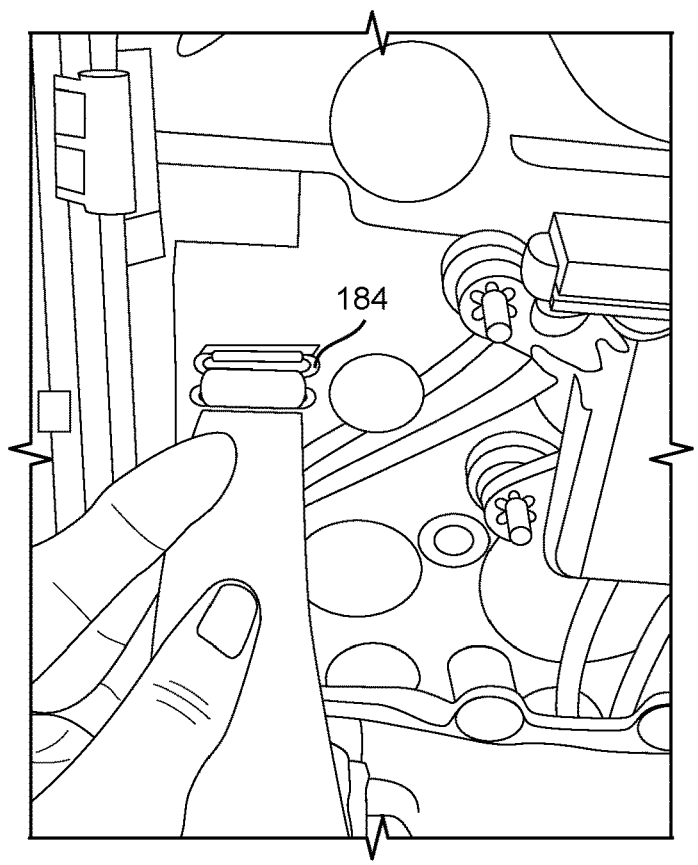

Referring to FIG. 17, and as will be appreciated by those of ordinary skill in the art, the seat carrier assemblies 106,112 (FIG. 7) can be finished as modules and/or attached to the underlying frame structures 102,104 (FIG. 7) using screws 182, hook-and-loop type fasteners 184, and/or any other suitable types of fasteners, all of which are contemplated by the present invention.

Again, the present invention provides a vehicle seat cushion carrier assembly (bottom and back) via which a cushion carrier structure, cushion foam, and upholstery are more easily assembled and installed in a vehicle, optionally as a modular unit. The cushion carrier structure can be multi-piece and incorporate any desired trim units. The cushion carrier structure also has a design and configuration that allows the cushion carrier structure to be readily and securely coupled to the underlying seat pan and/or seat frame. Strap fasteners are used to secure the upholstery to the cushion carrier structure and cushion foam, creating the desired creating seams, creases, and indentations. This replaces the use of difficult and time consuming hog rings and the like. Clip fasteners are used to secure the upholstery to the cushion carrier structure around the cushion foam, replacing mechanisms that secure the upholstery to the seat frame, especially with respect to the seat back. This allows much of the upholstering to be done outside the vehicle, optionally in a modular manner. Finally, these modular features and functionalities allow the cushion carrier assemblies (bottom and back) to be quickly and easily secured to the underlying seat pan and/or seat frame using simple screws, hooks, and clip fasteners. The cushion carrier assembly finds applicability in all types of vehicles, both traditional and autonomous driving (AD), and in both traditional and modular manufacturing and assembly processes.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

What is claimed is:

1. A vehicle seat cushion carrier assembly, comprising:
   a seat cushion carrier structure adapted to be selectively coupled to seat frame of a vehicle seat;
   a seat cushion coupled to the seat cushion carrier structure; and
   an upholstery material disposed about the seat cushion and secured to the seat cushion carrier structure using a plurality of strap fasteners and a plurality of clip fasteners;
   wherein each of the plurality of strap fasteners comprises a strap root adapted to be selectively coupled to an underside of the upholstery material and an adjoining elongate member adapted to be disposed completely through the seat cushion and engage a locking boss coupled to one of an underside and a backside of the seat cushion carrier structure.

2. The vehicle seat cushion carrier assembly of claim 1, wherein the strap root defines a retention channel adapted to selectively engage and retain one or more of a bead structure joined to the underside of the upholstery material and a seam manufactured into the underside of the upholstery material.

3. The vehicle seat cushion carrier assembly of claim 1, wherein the elongate member defines one or more holes adapted to selectively engage and be retained by the locking boss coupled to the one of the underside and the backside of the seat cushion carrier structure.

4. The vehicle seat cushion carrier assembly of claim 1, wherein the elongate member is manufactured from a flexible material.

5. The vehicle seat cushion carrier assembly of claim 1, wherein each of the plurality of clip fasteners comprises a rail clip attached to an edge of the upholstery material and disposed about an edge of the seat cushion carrier structure.

6. The vehicle seat cushion carrier assembly of claim 1, wherein the locking boss is disposed within a recess manufactured into the one of the underside and the backside of the seat cushion carrier structure, wherein the recess is adapted to receive an end portion of the elongate member.

7. A vehicle seat upholstery strap fastener assembly, comprising:
    a seat cushion carrier structure adapted to be selectively coupled to seat frame of a vehicle seat; and
    a strap fastener, comprising:
        a strap root adapted to be selectively coupled to an underside of an upholstery material; and
        an elongate member coupled to the strap root and adapted to be disposed completely through a seat cushion and engage a locking boss coupled to one of and underside and a backside of the seat cushion carrier structure adjacent to which the seat cushion is disposed.

8. The vehicle seat upholstery strap fastener assembly of claim 7, wherein the strap root and the elongate member are integrally formed.

9. The vehicle seat upholstery strap fastener assembly of claim 7, wherein the strap root defines a retention channel adapted to selectively engage and retain one or more of a bead structure joined to the underside of the upholstery material and a seam manufactured into the underside of the upholstery material.

10. The vehicle seat upholstery strap fastener assembly of claim 7, wherein the elongate member defines one or more holes adapted to selectively engage and be retained by the locking boss coupled to the one of the underside and the backside of the seat cushion carrier structure.

11. The vehicle seat upholstery strap fastener assembly of claim 7, wherein the elongate member is manufactured from a flexible material.

12. The vehicle seat upholstery strap fastener assembly of claim 7, wherein the elongate member defines a channel adapted to selectively engage and be guided by a guide boss coupled to the backside of the seat cushion carrier structure.

13. The vehicle seat upholstery strap fastener assembly of claim 7, wherein the elongate member is adapted to selectively engage and be guided by a guide recess structure disposed one of in and on the backside of the seat cushion carrier structure.

14. The vehicle seat upholstery strap fastener assembly of claim 7, wherein the elongate member comprises a tapered tip portion opposite the strap root.

15. The vehicle seat upholstery strap fastener assembly of claim 7, wherein the elongate member comprises one or more friction gripping structures disposed on an exterior surface thereof.

16. The vehicle seat upholstery strap fastener assembly of claim 7, wherein the locking boss is disposed within a recess manufactured into the one of the underside and the backside of the seat cushion carrier structure, wherein the recess is adapted to receive an end portion of the elongate member.

17. A vehicle seat assembled by a process comprising:
    coupling a modular seat cushion carrier assembly to a seat frame of the vehicle seat, wherein the modular seat cushion carrier assembly comprises:
        a seat cushion carrier structure adapted to be selectively coupled to the seat frame of the vehicle seat;
        a seat cushion coupled to the seat cushion carrier structure; and
        an upholstery material disposed about the seat cushion and secured to the seat cushion carrier structure using a plurality of strap fasteners and a plurality of clip fasteners;
    wherein each of the plurality of strap fasteners comprises a strap root adapted to be selectively coupled to an underside of the upholstery material and an adjoining elongate member adapted to be disposed completely through the seat cushion and engage a locking boss coupled to one of an underside and a backside of the seat cushion carrier structure.

18. The vehicle seat of claim 17, wherein the strap root defines a retention channel adapted to selectively engage and retain one or more of a bead structure joined to the underside of the upholstery material and a seam manufactured into the underside of the upholstery material.

19. The vehicle seat of claim 17, wherein the elongate member defines one or more holes adapted to selectively engage and be retained by the locking boss coupled to the one of the underside and the backside of the seat cushion carrier structure.

20. The vehicle seat of claim 17, wherein the elongate member is manufactured from a flexible material.

21. The vehicle seat of claim 17, wherein each of the plurality of clip fasteners comprises a rail clip attached to an edge of the upholstery material and disposed about an edge of the seat cushion carrier structure.

22. The vehicle seat of claim 17, wherein the locking boss is disposed within a recess manufactured into the one of the underside and the backside of the seat cushion carrier structure, wherein the recess is adapted to receive an end portion of the elongate member.

* * * * *